(12) United States Patent
Okitsuka et al.

(10) Patent No.: US 11,267,231 B2
(45) Date of Patent: Mar. 8, 2022

(54) INTERMEDIATE FILM FOR LAMINATED GLASS, ROLLED BODY, AND LAMINATED GLASS

(71) Applicant: SEKISUI CHEMICAL CO., LTD., Osaka (JP)

(72) Inventors: Masumi Okitsuka, Osaka (JP); Yuki Ishikawa, Osaka (JP); Mika Matsuda, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 16/964,143

(22) PCT Filed: Jan. 30, 2019

(86) PCT No.: PCT/JP2019/003178
§ 371 (c)(1),
(2) Date: Jul. 22, 2020

(87) PCT Pub. No.: WO2019/151325
PCT Pub. Date: Aug. 8, 2019

(65) Prior Publication Data
US 2021/0031495 A1      Feb. 4, 2021

(30) Foreign Application Priority Data
Feb. 2, 2018   (JP) .............................. JP2018-017721

(51) Int. Cl.
*B32B 17/10* (2006.01)
*B32B 27/08* (2006.01)
(Continued)

(52) U.S. Cl.
CPC ........ *B32B 17/10761* (2013.01); *B32B 17/10* (2013.01); *B32B 17/10036* (2013.01);
(Continued)

(58) Field of Classification Search
None
See application file for complete search history.

(56) References Cited

U.S. PATENT DOCUMENTS 5,413,863 A * 5/1995 Weber ............... B32B 17/10036
428/428
2015/0030860 A1    1/2015 Shimamoto et al.
(Continued)

FOREIGN PATENT DOCUMENTS

EP       2 803 648 A1    11/2014
EP       3 275 934 A1     1/2018
(Continued)

OTHER PUBLICATIONS

Written Opinion of the International Searching Authority (PCT/ISA/237) for Application No. PCT/JP2019/003178 dated Apr. 9, 2019 (English Translation mailed Aug. 13, 2020).
(Continued)

*Primary Examiner* — Ramsey Zacharia
(74) *Attorney, Agent, or Firm* — Cheng Law Group, PLLC

(57) ABSTRACT

Provided is an interlayer film for laminated glass capable of enhancing the interlayer adhesive force, and enhancing the sound insulating property after a lapse of a certain period of time from production of the interlayer film. An interlayer film for laminated glass according to the present invention is an interlayer film for laminated glass having a one-layer or a two or more-layer structure, a compound obtained by trimethylsilylating the polyvinyl acetate in the presence of N,O-bis(trimethylsilyl)trifluoroacetamide shows a hydrogen peak of trimethylsilyl group existing at 0.06 ppm or more and 0.3 ppm or less in $^1$H-NMR measurement in chloroform-d, and a ratio of peak intensity of all peaks existing at 0.06 ppm or more and 0.3 ppm or less, to intensity of all
(Continued)

peaks existing at 4.5 ppm or more and 5.3 ppm or less satisfies 0.02 or more and 3 or less.

16 Claims, 2 Drawing Sheets

(51) Int. Cl.
  *B32B 27/22* (2006.01)
  *B32B 27/30* (2006.01)
(52) U.S. Cl.
  CPC .. *B32B 17/10605* (2013.01); *B32B 17/10788* (2013.01); *B32B 27/08* (2013.01); *B32B 27/22* (2013.01); *B32B 27/306* (2013.01); *B32B 2250/05* (2013.01); *B32B 2605/006* (2013.01)

(56) References Cited

U.S. PATENT DOCUMENTS

| 2016/0318278 A1 | 11/2016 | Nakayama et al. |
| 2019/0193377 A1 | 6/2019 | Shimamoto et al. |
| 2020/0130338 A1 | 4/2020 | Ishikawa et al. |
| 2020/0139679 A1 | 5/2020 | Ishikawa et al. |
| 2020/0171798 A1 | 6/2020 | Sakamoto et al. |

FOREIGN PATENT DOCUMENTS

| JP | 2000-247690 A | 9/2000 |
| JP | 2015-151326 A | 8/2015 |
| WO | WO-2013/105657 A1 | 7/2013 |
| WO | WO-2018/212332 A1 | 11/2018 |
| WO | WO-2019/021999 A1 | 1/2019 |
| WO | WO-2019/022000 A1 | 1/2019 |

OTHER PUBLICATIONS

International Search Report for the Application No. PCT/JP2019/003178 dated Apr. 9, 2019.
Written Opinion of the International Searching Authority (PCT/ISA/237) for Application No. PCT/JP2019/003178 dated Apr. 9, 2019.
Supplementary European Search Report for the Application No. 19 747 230.1 dated Sep. 30, 2021.

* cited by examiner

[FIG. 1]
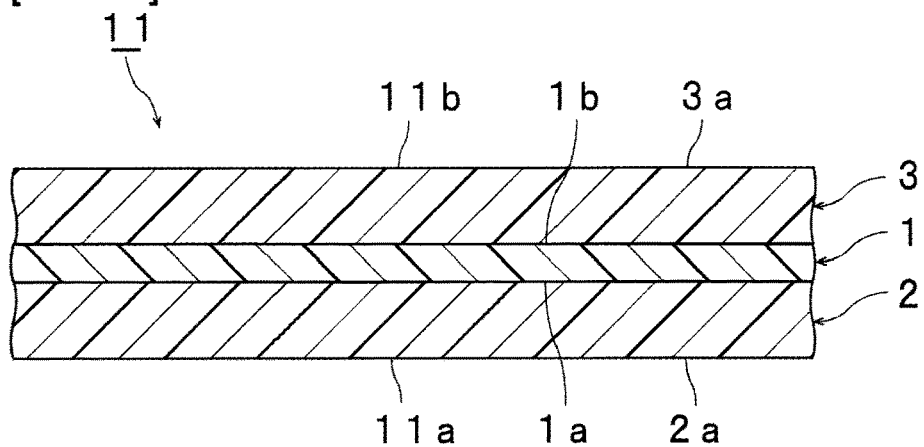
[FIG. 2]
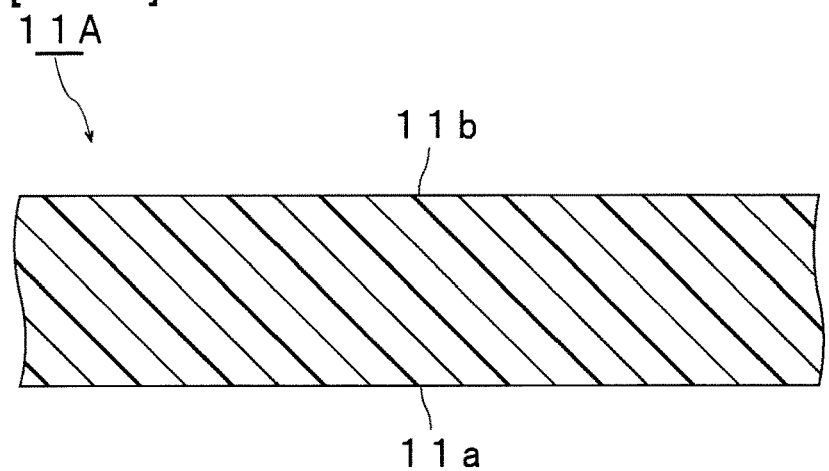
[FIG. 3]
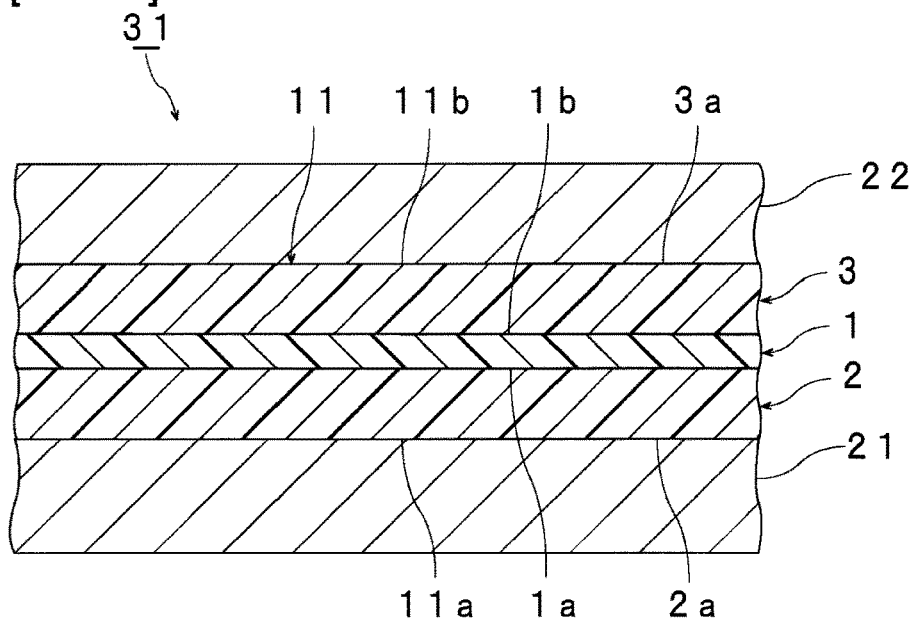

[FIG. 4]
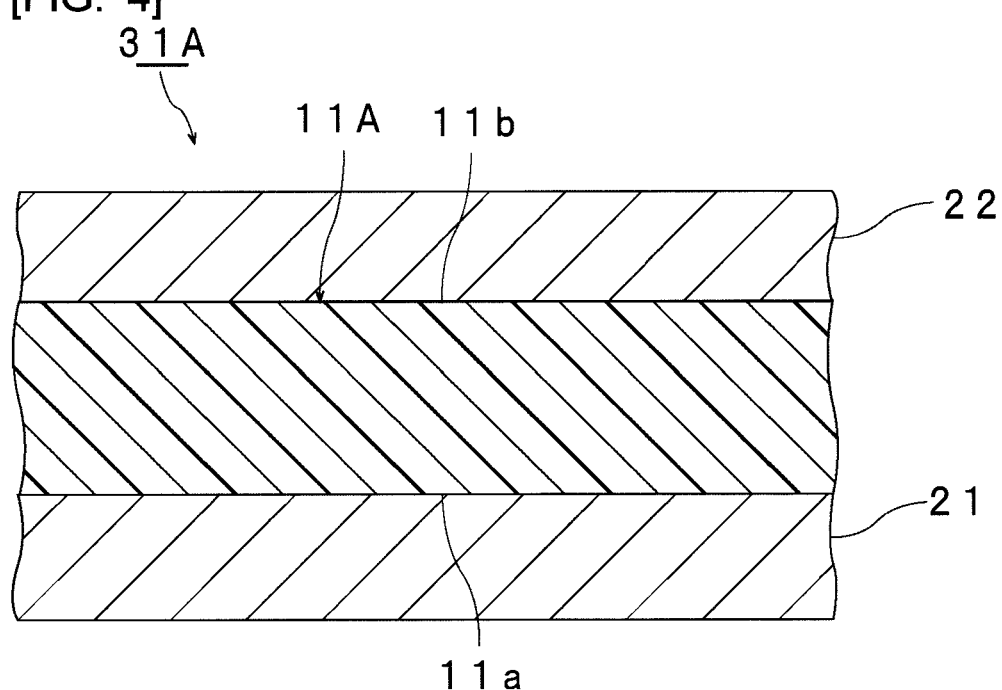
[FIG. 5]
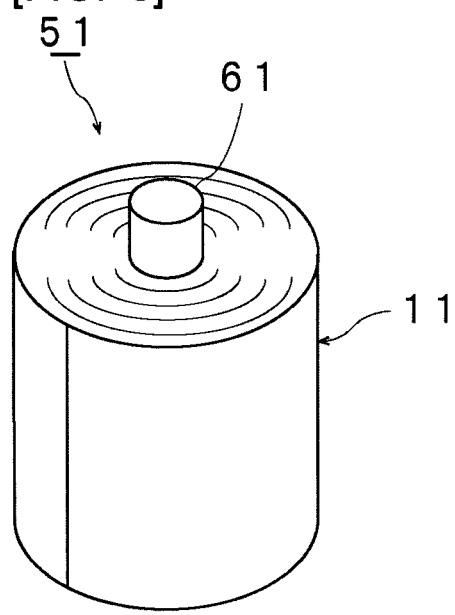

INTERMEDIATE FILM FOR LAMINATED GLASS, ROLLED BODY, AND LAMINATED GLASS

TECHNICAL FIELD

The present invention relates to an interlayer film for laminated glass which is used for obtaining laminated glass. Moreover, the present invention relates to a roll body and laminated glass both of which are prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

As one example of the interlayer film for laminated glass, the following Patent Document 1 discloses an interlayer film containing 100 parts by weight of a partial saponified product of an ethylene-vinyl acetate copolymer or an acid modified product thereof, 2 to 20 parts by weight of rosins, and 0.5 to 10 parts by weight of plasticizer. Patent Document 1 indicates that an adhesive interlayer film for laminated glass having excellent resistance to plasticizer in addition to adhesivity and transparency can be provided. Patent Document 1 indicates that the interlayer film well adheres to glass, polyester films, polarizing films, acrylic boards, polycarbonate boards, and the like.

The following Patent Document 2 discloses an interlayer film including a first layer, and a second layer layered on a first surface side of the first layer. In the interlayer film, the first layer contains a polyvinyl acetate resin, and a plasticizer. Patent Document 2 indicates that the sound insulating property can be enhanced in laminated glass.

RELATED ART DOCUMENTS

Patent Documents

Patent Document 1: JP 2000-247690A
Patent Document 2: WO2013/105657A1

SUMMARY OF THE INVENTION

Problems to be Solved by the Invention

In the conventional interlayer film according to Patent Document 1, the sound insulating property is not always enhanced although the adhesivity can be enhanced to some extent.

Also, in the conventional interlayer film according to Patent Document 1, the adhesive force is not greatly enhanced although the adhesivity can be enhanced to some extent.

Also, the sound insulating property can be deteriorated after a lapse of a certain period of time from production of the conventional interlayer film.

The present invention is aimed at providing an interlayer film for laminated glass capable of enhancing the interlayer adhesive force, and enhancing the sound insulating property after a lapse of a certain period of time from production of the interlayer film. Moreover, the present invention is also aimed at providing a roll body and a laminated glass both of which are prepared with the interlayer film for laminated glass.

Means for Solving the Problems

According to a broad aspect of the present invention, there is provided an interlayer film for laminated glass (hereinafter, also referred to as an interlayer film) having a one-layer or a two or more-layer structure, the interlayer film including a first layer containing polyvinyl acetate, a compound obtained by trimethylsilylating the polyvinyl acetate in the presence of N,O-bis(trimethylsilyl)trifluoroacetamide showing a hydrogen peak of trimethylsilyl group existing at 0.06 ppm or more and 0.3 ppm or less in $^1$H-NMR measurement in chloroform-d, a ratio of peak intensity of all peaks existing at 0.06 ppm or more and 0.3 ppm or less, to intensity of all peaks existing at 4.5 ppm or more and 5.3 ppm or less satisfying 0.02 or more and 3 or less.

In a specific aspect of the interlayer film according to the present invention, the polyvinyl acetate has a weight average molecular weight of 300000 or more.

In a specific aspect of the interlayer film according to the present invention, the first layer contains a plasticizer.

In a specific aspect of the interlayer film according to the present invention, a content of the plasticizer per 100 parts by weight of the polyvinyl acetate in the first layer is 30 parts by weight or more.

In a specific aspect of the interlayer film according to the present invention, the interlayer film includes a second layer, and the second layer is layered on a first surface of the first layer.

In a specific aspect of the interlayer film according to the present invention, the second layer contains a thermoplastic resin.

In a specific aspect of the interlayer film according to the present invention, the thermoplastic resin in the second layer is a polyvinyl acetal resin.

In a specific aspect of the interlayer film according to the present invention, the first layer contains a plasticizer, and the second layer contains a plasticizer.

In a specific aspect of the interlayer film according to the present invention, a plasticizer having the largest content in the aforementioned plasticizer in the second layer, and a plasticizer having the largest content in the aforementioned plasticizer in the first layer are the same, and a combination of a plasticizer having the largest content in the aforementioned plasticizer in the second layer, the thermoplastic resin in the second layer, a plasticizer having the largest content in the aforementioned plasticizer in the first layer, and the polyvinyl acetate in the first layer satisfies the following configuration.

Configuration: a cloud point measured by using a mixed liquid of 100 parts by weight of a plasticizer having the largest content in the aforementioned plasticizer in the second layer, and 8 parts by weight of the thermoplastic resin in the second layer is higher than a cloud point measured by using a mixed liquid of 100 parts by weight of a plasticizer having the largest content in the aforementioned plasticizer in the first layer and 8 parts by weight of the polyvinyl acetate in the first layer by 30° C. or more.

In a specific aspect of the interlayer film according to the present invention, the interlayer film includes a third layer, and the third layer is layered on a second surface opposite to the first layer of the first layer.

In a specific aspect of the interlayer film according to the present invention, the third layer contains a thermoplastic resin.

In a specific aspect of the interlayer film according to the present invention, the thermoplastic resin in the third layer is a polyvinyl acetal resin.

In a specific aspect of the interlayer film according to the present invention, the first layer contains a plasticizer, the second layer contains a plasticizer, and the third layer contains a plasticizer.

In a specific aspect of the interlayer film according to the present invention, the second layer contains a thermoplastic resin, the third layer contains a thermoplastic resin, a content of the plasticizer per 100 parts by weight of the polyvinyl acetate in the first layer is larger than a content of the plasticizer per 100 parts by weight of the thermoplastic resin in the second layer, and a content of the plasticizer per 100 parts by weight of the polyvinyl acetate in the first layer is larger than a content of the plasticizer per 100 parts by weight of the thermoplastic resin in the third layer.

According to a broad aspect of the present invention, there is provided a roll body including a winding core and the above-described interlayer film for laminated glass, the interlayer film for laminated glass being wound around an outer periphery of the winding core.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

The interlayer film for laminated glass according to the present invention has a one-layer or a two or more-layer structure. The interlayer film for laminated glass according to the present invention includes a first layer containing a polyvinyl acetate. For a compound obtained by trimethylsilylating the polyvinyl acetate in the first layer of the interlayer film for laminated glass according to the present invention in the presence of N,O-bis(trimethylsilyl)trifluoroacetamide, $^1$H-NMR in chloroform-d is measured. In the interlayer film for laminated glass according to the present invention, a hydrogen peak of trimethylsilyl group in the measurement of $^1$H-NMR exists at 0.06 ppm or more and 0.3 ppm or less. In the interlayer film for laminated glass according to the present invention, in the measurement of $^1$H-NMR, a ratio of peak intensity of all peaks existing at 0.06 ppm or more and 0.3 ppm or less to intensity of all peaks existing at 4.5 ppm or more and 5.3 ppm or less satisfies 0.02 or more and 3 or less. In the present invention, since the interlayer film for laminated glass is provided with the aforementioned configuration, it is possible to enhance the interlayer adhesive force, and it is possible to enhance the sound insulating property after a lapse of a certain period of time from production of the interlayer film.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a perspective view schematically showing a roll body prepared by winding the interlayer film for laminated glass shown in FIG. 1.

MODES FOR CARRYING OUT THE INVENTION

Hereinafter, the present invention will be described in detail.

(Interlayer Film for Laminated Glass)

The interlayer film for laminated glass according to the present invention (hereinafter, also referred to as an interlayer film) has a one-layer or a two or more-layer structure.

The interlayer film according to the present invention includes a first layer containing a polyvinyl acetate.

For a compound obtained by trimethylsilylating the polyvinyl acetate in the first layer of the interlayer film according to the present invention in the presence of N,O-bis(trimethylsilyl)trifluoroacetamide, $^1$H-NMR in chloroform-d is measured. The trimethylsilylated compound is trimethylsilylated polyvinyl acetate (TMS). In the interlayer film according to the present invention, a hydrogen peak of trimethylsilyl group in the measurement of $^1$H-NMR exists at 0.06 ppm or more and 0.3 ppm or less. In the interlayer film for laminated glass according to the present invention, in the measurement of $^1$H-NMR, a ratio of peak intensity of all peaks existing at 0.06 ppm or more and 0.3 ppm or less to intensity of all peaks existing at 4.5 ppm or more and 5.3 ppm or less satisfies 0.02 or more and 3 or less. In the interlayer film according to the present invention, when the intensity of all peaks existing at 4.5 ppm or more and 5.3 ppm or less is defined as 1, the peak intensity of all peaks existing at 0.06 ppm or more and 0.3 ppm or less is 0.02 or more and 3 or less.

In the present invention, since the interlayer film is provided with the aforementioned configuration, it is possible to enhance the interlayer adhesive force, and it is possible to enhance the sound insulating property after a lapse of a certain period of time from production of the interlayer film. In the present invention, for example, it is possible to enhance the adhesive force of the first layer with the second layer. For example, delamination is less likely to occur even when the interlayer film is bent or formed into a roll body.

Also, in the present invention, it is possible to enhance the adhesive force of the first layer with a lamination glass member, and it is possible to enhance the adhesive force of the first layer with other layer in the interlayer film. In particular, it is possible to enhance the adhesive force of the first layer with other layer in the interlayer film. Further, particularly when the other layer contains a polyvinyl acetal resin, it is possible to enhance the adhesive force of the first layer with the other layer containing a polyvinyl acetal resin.

Trimethylsilylation of the polyvinyl acetate can be conducted in the following manner.

After swelling 100 mg of polyvinyl acetate with a small amount of chloroform, 250 μL of a trimethylsilylating agent (N,O-bis(trimethylsilyl)trifluoroacetamide: BSTFA) is added, and stirred in a shaker for 1 hour. A deuteriochloroform solvent (250 μL) is added, and the solution is stirred for another 1 hour in the shaker to obtain a trimethylsilylated polyvinyl acetate.

As a method for trimethylsilylating polyvinyl acetate contained in the interlayer film, the following method can be recited. When the interlayer film is, for example, a multilayer interlayer film including a first layer, a second layer and a third layer, the multilayer film is delaminated into the first layer, and the second and third layers to obtain the first layer. When the interlayer film is a monolayer interlayer film including only a first layer, the interlayer film itself is the first layer. After dissolving the first layer in tetrahydrofuran (THF), polyvinyl acetate is separated by liquid chromatography. Then, the solvent is distilled off and the residue is dried to obtain polyvinyl acetate. The obtained polyvinyl acetate is trimethylsilylated in the same manner as described above. In the case of a laminated glass, after cooling the laminated glass with liquid nitrogen or the like, the interlayer film and a lamination glass member may be delaminated, and trimethylsilylation of the polyvinyl acetate may be conducted using the obtained interlayer film.

In the interlayer film according to the present invention, a hydrogen peak of trimethylsilyl group in the measurement of $^1$H-NMR exists at 0.06 ppm or more and 0.3 ppm or less.

A ratio (peak intensity of all peaks existing at 0.06 ppm or more and 0.3 ppm or less/intensity of all peaks existing at 4.5 ppm or more and 5.3 ppm or less) is also referred to as a peak ratio. In the interlayer film for laminated glass according to the present invention, the peak ratio satisfies 0.02 or more and 3 or less in the measurement of $^1$H-NMR. The peak intensity of all peaks is a total of intensity of all peeks. The peak ratio is a value when the intensity of all peaks existing at 4.5 ppm or more and 5.3 ppm or less in the measurement of $^1$H-NMR is defined as 1.

From the viewpoint of effectively enhancing the sound insulating property and the interlayer adhesive force, the peak ratio is preferably 0.03 or more, more preferably 0.04 or more, and further preferably 0.05 or more, and is preferably 3.0 or less, and more preferably 2.5 or less.

The peaks existing at 4.5 ppm or more and 5.3 ppm or less originate in structural units derived from vinyl acetate.

The interlayer film according to the present invention may have a one-layer structure of only a first layer. The interlayer film according to the present invention may have a two-layer structure, may have a two or more-layer structure, may have a three-layer structure and may have a three or more-layer structure. The interlayer film may be a single-layered interlayer film and may be a multi-layered interlayer film.

From the viewpoint of effectively enhancing the sound insulating property and adhesivity between layers, the interlayer film according to the present invention may include a first layer, and a second layer layered on a first surface of the first layer.

From the viewpoint of effectively enhancing the sound insulating property and adhesivity between layers, the interlayer film according to the present invention may include a first layer, and a second layer layered on a first surface of the first layer, and may further include a third layer layered on a second surface opposite to the first surface of the first layer. In this case, the first layer contains the polyvinyl acetate. In the present invention, it is possible to enhance the adhesive force of the first layer with the second layer, and it is possible to enhance the adhesive force of the first layer with the third layer.

From the viewpoint of effectively enhancing the sound insulating property and adhesivity between layers, the interlayer film according to the present invention may further include a fourth layer arranged on a side opposite to the first layer side of the second layer, and may further include a fifth layer arranged on a side opposite to the first layer side of the third layer.

From the viewpoint of effectively enhancing the sound insulating property and adhesivity between the interlayer film and the glass, it is preferred that the first layer be not a surface layer in the interlayer film, and it is preferred that the resin layer be an intermediate layer in the interlayer film. It is to be noted that the first layer may be a surface layer in the interlayer film. Each of the second layer, the third layer, the fourth layer and the fifth layer may be a surface layer in the interlayer film, or may be an intermediate layer in the interlayer film.

From the viewpoint of enhancing the transparency of the interlayer film and the laminated glass, the haze of the interlayer film is preferably 2.0% or less, more preferably 1.0% or less, still more preferably 0.5% or less, further preferably 0.4% or less, especially preferably 0.3% or less, and most preferably 0.2% or less.

The haze of the interlayer film can be measured in conformity with JIS K6714. The haze of the interlayer film may be measured while the interlayer film is arranged between two sheets of clear glass. It is preferred that the clear glass have a thickness of 2.0 mm.

From the viewpoint of enhancing the transparency of the laminated glass, the visible light transmittance of the interlayer film is preferably 70% or more, more preferably 80% or more, further preferably 85% or more.

The visible light transmittance is measured at a wavelength ranging from 380 to 780 nm by using a spectrophotometer ("U-4100" available from Hitachi High-Tech Corporation) in conformity with JIS R3211:1998.

The visible light transmittance of the interlayer film may be measured while the interlayer film is arranged between two sheets of clear glass. It is preferred that the clear glass have a thickness of 2.0 mm.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. Specifically, the interlayer film 11 has a three-layer structure. The interlayer film 11 is used for obtaining laminated glass. The interlayer film 11 is an interlayer film for laminated glass. The interlayer film 11 is provided with a first layer 1, a second layer 2 and a third layer 3. The second layer 2 is arranged on a first surface 1a side of the first layer 1 to be layered thereon. The third layer 3 is arranged on a second surface 1b side opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

FIG. 5 is a perspective view schematically showing a roll body prepared by winding the interlayer film for laminated glass shown in FIG. 1.

An interlayer film 11 may be wound to be formed into a roll body 51 of the interlayer film 11.

The roll body 51 shown in FIG. 5 includes a winding core 61 and the interlayer film 11. The interlayer film 11 is wound around an outer periphery of the winding core 61.

FIG. 2 is a sectional view schematically showing an interlayer film for laminated glass in accordance with a second embodiment of the present invention.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

Hereinafter, the details of the interlayer film according to the present invention, the first layer, the second layer and the third layer, and the details of each ingredient used in the interlayer film will be described.

(Resin)

The first layer contains polyvinyl acetate (hereinafter, also referred to as a polyvinyl acetate (1)). The polyvinyl acetate (1) in the first layer is not particularly limited. The polyvinyl acetate (1) is generally a thermoplastic resin. One kind of the polyvinyl acetate (1) may be used alone and two or more kinds thereof may be used in combination.

The polyvinyl acetate (1) is a polyvinyl acetate that satisfies the aforementioned peak and the peak intensity in the measurement of $^1$H-NMR in chloroform-d.

Examples of the functional group in which a trimethylsilylated peak exists in the above range include a hydroxyl group, an amide group, a carboxyl group, and the like. From the viewpoint of effectively enhancing the sound insulating property and the interlayer adhesive force, the functional group is preferably a hydroxyl group or an amide group, and more preferably a hydroxyl group.

It is preferred that the polyvinyl acetate (1) be a polymer of a polymerizable composition containing vinyl acetate and a monomer having the above-described functional group because excellent effect of the present invention is achieved.

Examples of the monomer having the above-described functional group include 3-methyl-3-buten-1-ol, ethylene glycol monovinyl ether, isopropylacrylamide, and the like.

From the viewpoint of effectively enhancing the sound insulating property, the weight average molecular weight of the polyvinyl acetate (1) is preferably 250000 or more, more preferably 300000 or more, further preferably 400000 or more, especially preferably 500000 or more. From the viewpoint of enhancing the interlayer adhesive force, the weight average molecular weight of the polyvinyl acetate (1) is preferably 1200000 or less, more preferably 900000 or less.

The weight average molecular weight refers to a weight average molecular weight, calculated on the polystyrene equivalent basis, measured by gel permeation chromatography (GPC).

The method for polymerizing the polymerizable composition to synthesize the polyvinyl acetate (1) is not particularly limited. Examples of the synthesizing method include a solution polymerization, suspension polymerization, UV polymerization, and the like.

From the viewpoint of increasing the transparency of the interlayer film, and effectively enhancing the sound insulating property and the interlayer adhesive force in the interlayer film having increased transparency, the synthesizing method of the polyvinyl acetate (1) is preferably solution polymerization.

The polyvinyl acetate (1) also includes a copolymer of vinyl acetate and a monomer having a peak of trimethylsilyl group existing within a specified range, and a polymerizable compound (copolymerizing component) other than these compounds. The polymerizable composition may contain a polymerizable compound other than the vinyl acetate and the monomer. It is preferred that the polymerizable composition contain vinyl acetate as a main ingredient as a polymerizable compound. The rate of the structural unit (skeleton) derived from vinyl acetate in 100% by mole of the total structural units (skeleton) of the polyvinyl acetate (1) is preferably 50% by mole or more, more preferably 60% by mole or more, further preferably 70% by mole or more, especially preferably 80% by mole or more, most preferably 90% by mole or more. Examples of the polymerizable compound other than vinyl acetate include a (meth)acryl compound, a styrene compound and an isoprene compound.

When there are two or more peaks at 4.5 ppm or more and 5.3 ppm or less in the measurement of $^1$H-NMR due to the existence of the polymerizable compound other than vinyl acetate, peak intensity existing at 5.0 ppm or more and 5.3 ppm or less is defined as 1.

The first layer may contain a thermoplastic resin other than the polyvinyl acetate (1). The first layer may contain a polyvinyl acetal resin (hereinafter, also referred to as a polyvinyl acetal resin (1)).

When the first layer contains the polyvinyl acetate (1) and the polyvinyl acetal resin (1), it is preferred that the following preferred contents be satisfied. The content of the polyvinyl acetate (1) in 100% by weight of the total of the polyvinyl acetate (1) and the polyvinyl acetal resin (1) is preferably 1% by weight or more, more preferably 10% by weight or more, further preferably 20% by weight or more, and especially preferably 50% by weight or more. The content of the polyvinyl acetate (1) in 100% by weight of the total of the polyvinyl acetate (1) and the polyvinyl acetal resin (1) is preferably 99% by weight or less, more preferably 90% by weight or less, and further preferably 80% by weight or less. When the content is the above upper limit or less, the interlayer adhesive force is further enhanced. When the content is the above lower limit or more, the sound insulating property of the laminated glass is further enhanced.

It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (2) and the thermoplastic resin (3) may be the same as or different from each other. The polyvinyl acetal resin (2) and the polyvinyl acetal resin (3) may be the same or different from each other. For still higher sound insulating property, it is preferred that the thermoplastic resin (2) and the thermoplastic resin (3) be the same. For still higher sound insulating property, it is preferred that the polyvinyl acetal resin (2) and the polyvinyl acetal resin (3) be the same. One kind of each of the thermoplastic resin (2) and the thermoplastic resin (3) may be used alone, and two or more kinds thereof may be used in combination. One kind of each of the polyvinyl acetal resin (2) and the polyvinyl acetal resin (3) may be used alone, and two or more kinds thereof may be used in combination.

The thermoplastic resin means a resin that softens and exhibits plasticity when it is heated, and hardens when it is cooled to room temperature. Among the thermoplastic resins, especially the thermoplastic elastomer means a resin that softens and exhibits plasticity when it is heated, and hardens to exhibits rubber elasticity when it is cooled to room temperature (25° C.)

Examples of the thermoplastic resin include a polyvinyl acetal resin, a polyester resin, an aliphatic polyolefin, polystyrene, an ethylene-vinyl acetate copolymer resin, an ethylene-acrylic acid copolymer resin, a polyurethane resin, an ionomer resin, a polyvinyl alcohol resin, and a polyvinyl acetate resin. Thermoplastic resins other than these may be used.

The thermoplastic resins exemplified above can be a thermoplastic elastomer by adjusting the molecular structure, the polymerization degree, and the like of the resin.

It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance and the flexural rigidity of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group in the polyvinyl acetal resin is preferably 2 to 10, more preferably 2 to 5, and further preferably 2, 3 or 4. Also, it is preferred that the number of carbon atoms of the acetal group in the polyvinyl acetal resin be 2 or 4, and in this case, the polyvinyl acetal resin is efficiently produced.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, cuminaldehyde, benzaldehyde, and the like. Acetaldehyde, propionaldehyde, n-butyraldehyde, isobutyraldehyde, n-hexylaldehyde or n-valeraldehyde is preferred. Acetaldehyde, propionaldehyde, n-butyraldehyde, isobutyraldehyde or n-valeraldehyde is more preferred, and acetaldehyde, n-butyraldehyde or n-valeraldehyde is further preferred. One kind of the aldehyde may be used alone, and two or more kinds thereof may be used in combination.

Each of the contents of the hydroxyl group of the polyvinyl acetal resin (2) and the polyvinyl acetal resin (3) is preferably 25% by mole or more, preferably 38% by mole or less, more preferably 35% by mole or less, further preferably 32% by mole or less, especially preferably 30% by mole or less, and most preferably 27.5% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated. When the content of the hydroxyl group is the above upper limit or less, the rigidity is effectively enhanced.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of each of the polyvinyl acetal resin (2) and the polyvinyl acetal resin (3) (the butyralization degree in the case of a polyvinyl butyral resin) is preferably 55% by mole or more and more preferably 67% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

It is preferred that the interlayer film contain a plasticizer. It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the penetration resistance is further improved, and the adhesive force of a layer containing the polyvinyl acetal resin and the plasticizer to a lamination glass member or another layer is moderately increased. The plasticizer is not particularly limited. The plasticizer (1), the plasticizer (2) and the plasticizer (3) may be the same or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer, an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl maleate, bis(2-butoxyethyl) adipate, dibutyl adipate, diisobutyl adipate, 2,2-butoxyethoxyethyl adipate, benzoic acid glycol ester, adipic acid 1,3-butyleneglycol polyester, dihexyl adipate, dioctyl adipate, hexyl cyclohexyl adipate, a mixture of heptyl adipate and nonyl adipate, diisononyl adipate, diisodecyl adipate, heptyl nonyl adipate, tributyl citrate, tributyl acetylcitrate, diethyl carbonate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, tricresyl phosphate, triisopropyl phosphate, and the like.

The plasticizer may be a diester plasticizer represented by the following formula (1).

[Chemical 1]

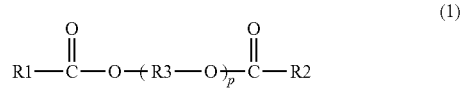

(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer contain an adipic acid ester, and it is more preferred that the plasticizer contain bis(2-butoxyethyl) adipate, or dibutyl adipate.

In the first layer, the content of the plasticizer (1) per 100 parts by weight of the polyvinyl acetate (1) is referred to as a content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

When the first layer contains the polyvinyl acetal resin (1), the content of the plasticizer (1) per 100 parts by weight of the total of the polyvinyl acetate (1) and the polyvinyl acetal resin (1) is referred to as a content (1A). The content (1A) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1A) is the above lower limit or more, the flexibility of the interlayer film is enhanced and the handling of the interlayer film is facilitated. When the content (1A) is the above upper limit or less, the penetration resistance of laminated glass is further enhanced.

In the second layer, the content of the plasticizer (2) per 100 parts by weight of the thermoplastic resin (2) (100 parts by weight of polyvinyl acetal resin (2) when the thermoplastic resin (2) is a polyvinyl acetal resin (2)) is referred to as a content (2). In the third layer, the content of the plasticizer (3) per 100 parts by weight of the thermoplastic resin (3) (100 parts by weight of polyvinyl acetal resin (3) when the thermoplastic resin (3) is a polyvinyl acetal resin (3)) is referred to as a content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

From the viewpoint of effectively enhancing the sound insulating property of the laminated glass, it is preferred that the content (1) be larger than the content (2) and it is preferred that the content (1) be larger than the content (3).

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

From the viewpoint of further enhancing the sound insulating property after a lapse of a certain period of time from production of the interlayer film, it is preferred that the interlayer film satisfy the following configuration (A1) and configuration (A2). Configuration (A1): a plasticizer having the largest content in the plasticizer (2) in the second layer, and a plasticizer having the largest content in the plasticizer (1) in the first layer are the same. Configuration (A2): a combination of a plasticizer having the largest content in the plasticizer (2) in the second layer, the thermoplastic resin (2) in the second layer, a plasticizer having the largest content in the plasticizer (1) in the first layer, and the polyvinyl acetate (1) in the first layer satisfies the following configuration (a).

Configuration (a): a cloud point that is measured by using a mixed liquid of 100 parts by weight of a plasticizer having the largest content in the plasticizer (2) in the second layer, and 8 parts by weight of the thermoplastic resin (2) in the second layer is referred to as a cloud point (2). A cloud point that is measured by using a mixed liquid of 100 parts by weight of a plasticizer having the largest content in the plasticizer (1) in the first layer, and 8 parts by weight of the polyvinyl acetate (1) in the first layer is referred to as a cloud point (1). The cloud point (2) is higher than the cloud point (1) by 30° C. or more.

From the viewpoint of further enhancing the sound insulating property after a lapse of a certain period of time from production of the interlayer film, it is preferred that the cloud point (2) be higher than the cloud point (1) more preferably by 40° C. or more, and further preferably by 50° C. or more in the above configuration.

From the viewpoint of further enhancing the sound insulating property after a lapse of a certain period of time from production of the interlayer film, it is preferred that the interlayer film satisfy the following configuration (B1) and configuration (B2). Configuration (B1): a plasticizer having the largest content in the plasticizer (3) in the third layer, and a plasticizer having the largest content in the plasticizer (1) in the first layer are the same. Configuration (B2): a combination of a plasticizer having the largest content in the plasticizer (3) in the third layer, the thermoplastic resin (3) in the third layer, a plasticizer having the largest content in the plasticizer (1) in the first layer, and the polyvinyl acetate (1) in the first layer satisfies the following configuration (b).

Configuration (b): a cloud point that is measured by using a mixed liquid of 100 parts by weight of a plasticizer having the largest content in the plasticizer (3) in the third layer, and 8 parts by weight of the thermoplastic resin (3) in the third layer is referred to as a cloud point (3). A cloud point that is measured by using a mixed liquid of 100 parts by weight of a plasticizer having the largest content in the plasticizer (1) in the first layer, and 8 parts by weight of the polyvinyl acetate (1) in the first layer is referred to as a cloud point (1). The cloud point (3) is higher than the cloud point (1) by 30° C. or more.

From the viewpoint of further enhancing the sound insulating property after a lapse of a certain period of time from production of the interlayer film, it is preferred that the cloud point (3) be higher than the cloud point (1) more preferably by 40° C. or more, and further preferably by 50° C. or more in the above configuration.

The cloud point means a temperature at which a cloud arises.

The cloud point is a cloud point that is measured in conformity with JIS K2266 "Testing method for pour point of crude oil and petroleum products, and cloud point of petroleum products". The cloud point measured by using the thermoplastic resin and the plasticizer is specifically measured in the following manner.

A plasticizer (3.5 g)(100 parts by weight), and 0.28 g (8 parts by weight) of a thermoplastic resin or a polyvinyl acetate are prepared. In a test tube (diameter of 2 cm), 3.5 g (100 parts by weight) of the plasticizer, and 0.28 g (8 parts by weight) of the thermoplastic resin or the polyvinyl acetate are mixed. A mixed liquid of the plasticizer, and the thermoplastic resin or polyvinyl acetate is heated to 180° C. Then, the test tube is left to stand in an atmosphere at −20° C. to let the temperature of the liquid drop to −15° C. The cloud point means the temperature at which a cloud arises in this liquid (First method for determining cloud point).

Examples of the method for measuring the temperature at which a cloud arises in the liquid (cloud point) include a method of visually observing the appearance of the liquid, a method of measuring the haze of the liquid with a haze meter, and a method of preparing a boundary sample of a plurality of levels concerning cloud in advance and determining the cloud with reference to the boundary sample. The method of visually observing the appearance of the liquid is preferred. When the haze of the liquid is measured with a haze meter, the temperature at which the haze reaches 10% or more is referred to as a cloud point.

For specifying the temperature at which a cloud arises more accurately, the following measurement method may be used.

A plasticizer (3.5 g)(100 parts by weight), and 0.28 g (8 parts by weight) of a thermoplastic resin or a polyvinyl acetate are prepared. In a test tube (diameter of 2 cm), 3.5 g (100 parts by weight) of the plasticizer, and 0.28 g (8 parts by weight) of the thermoplastic resin are mixed. A mixed liquid of the plasticizer, and the thermoplastic resin or polyvinyl acetate is heated to 180° C. Next, the liquid is heated to 180° C., and the test tube is left to stand in a thermostatic chamber at a predetermined temperature for 1 hour. The temperature of the thermostatic chamber is kept and the haze of the liquid in the test tube is measured with a haze meter. The lowest value of the storage temperature of the thermostatic chamber where the haze is 10% or more is referred to as a cloud point (Second method for determining cloud point). For example, after leaving the test tube to stand in the thermostatic chamber at 155° C., 150° C. and 145° C., respectively for 1 hour, the temperature of the thermostatic chamber is kept, and the haze of the liquid in the test tube is measured with a haze meter. By varying the storage temperature, it is possible to specifically specify the cloud point.

(Heat Shielding Substance)

The interlayer film may contain a heat shielding substance. The first layer may contain a heat shielding substance. The second layer may contain a heat shielding substance. The third layer may contain a heat shielding substance. One kind of the heat shielding substance may be used alone, and two or more kinds thereof may be used in combination.

The heat shielding substance may contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

The interlayer film may contain at least one kind of Ingredient X among a phthalocyanine compound, a naphthalocyanine compound and an anthracyanine compound. The first layer may contain the Ingredient X. The second layer may contain the Ingredient X. The third layer may contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

The Ingredient X may contain a vanadium atom or a copper atom. The Ingredient X may contain a vanadium atom, and may contain a copper atom. The Ingredient X may be at least one kind of phthalocyanines containing a vanadium atom or a copper atom, and derivatives of phthalocyanine containing a vanadium atom or a copper atom.

The interlayer film may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

As the heat shielding particles, metal oxide particles may be used. As the heat shielding particles, particles formed of an oxide of metal (metal oxide particles) may be used.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used.

(Metal Salt)

The interlayer film may contain at least one kind of metal salt (hereinafter, also referred to as Metal salt M) among an alkali metal salt, an alkaline earth metal salt, and a magnesium salt. The first layer may contain the Metal salt M. The second layer may contain the metal salt M. The third layer may contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

The Metal salt M may contain at least one kind of metal selected from the group consisting of Li, Na, K, Rb, Cs, Mg, Ca, Sr and Ba.

As the Metal salt M, an alkali metal salt of an organic acid having 2 to 16 carbon atoms, an alkali earth metal salt of an organic acid having 2 to 16 carbon atoms, or a magnesium salt of an organic acid having 2 to 16 carbon atoms can be used.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

(Ultraviolet Ray Screening Agent)

The interlayer film may contain an ultraviolet ray screening agent. The first layer may contain an ultraviolet ray screening agent. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group, and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

(Oxidation Inhibitor)

The interlayer film may contain an oxidation inhibitor. The first layer may contain an oxidation inhibitor. The second layer may contain an oxidation inhibitor. The third layer may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film is designated as T. The thickness of the first layer is preferably 0.035T or more, more preferably 0.0625T or more, further preferably 0.1T or more and is preferably 0.4T or less, more preferably 0.375T or less, further preferably 0.25T or less, especially preferably 0.15T or less. When the thickness of the first layer is 0.4T or less, the flexural rigidity is further improved.

The thickness of each of the second layer and the third layer is preferably 0.3T or more, more preferably 0.3125T or more, further preferably 0.375T or more and is preferably 0.97T or less, more preferably 0.9375T or less, further preferably 0.9T or less. The thickness of each of the second layer and the third layer may be 0.46875T or less, and may be 0.45T or less. When the thickness of each of the second layer and the third layer is the above-described lower limit or more and the above-described upper limit or less, the rigidity of the laminated glass is further enhanced.

A total thickness of the second layer and the third layer is preferably 0.625T or more, more preferably 0.75T or more, further preferably 0.85T or more and is preferably 0.97T or less, more preferably 0.9375T or less, further preferably 0.9T or less. When the total thickness of the second layer and the third layer is the above-described lower limit or more and the above-described upper limit or less, the rigidity of the laminated glass is further enhanced.

The interlayer film may be an interlayer film having a uniform thickness, or may be an interlayer film having varying thickness. The sectional shape of the interlayer film may be a rectangular shape and may be a wedge-like shape.

The production method of the interlayer film according to the present invention is not particularly limited. Examples of the production method of the interlayer film according to the present invention include a method of separately forming resin compositions used for constituting respective layers into respective layers, and then layering the obtained layers, a method of coextruding resin compositions used for constituting respective layers with an extruder and layering the layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calendar roll method, and a profile extrusion method. The emboss roll method is preferred because a large number of embosses of the protrusions and recesses, which is a quantitatively constant protrusion and recess pattern, can be formed.

(Laminated Glass)

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22 and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on a second layer 2. The second lamination glass member 22 is layered on a second surface 11b opposite to the first surface 11a of the interlayer film 11A.

FIG. 4 is a sectional view schematically showing an example of laminated glass prepared with the interlayer film for laminated glass shown in FIG. 2.

The laminated glass 31A shown in FIG. 4 is provided with a first lamination glass member 21, a second lamination glass member 22 and an interlayer film 11A. The interlayer film 11A is arranged between the first lamination glass member 21 and the second lamination glass member 22 to be sandwiched therebetween.

The first lamination glass member 21 is layered on a first surface 11a of the interlayer film 11A. The second lamination glass member 22 is layered on a second surface 11b opposite to the first surface 11a of the interlayer film 11A.

As described above, the laminated glass according to the present invention includes a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

It is preferred that the first lamination glass member be the first glass plate. It is preferred that the second lamination glass member be the second glass plate.

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The thickness of the glass plate may be 2 mm or less. Further, the thickness of the glass plate may be 1.8 mm or less, 1.6 mm or less, or 1.0 mm or less. When the thickness of the glass plate is the above upper limit or less, it is possible to reduce the weight of the laminated glass, and it is possible to reduce the environmental load by reducing the material of the laminated glass, and it is possible to reduce the environmental load by ameliorating the fuel consumption of an automobile by weight reduction of the laminated glass. The total of the thickness of the first glass plate and the thickness of the second glass plate may be 3.5 mm or less, and further may be 2.8 mm or less. When the total of the thickness of the first glass plate and the thickness of the second glass plate is the above upper limit or less, it is possible to reduce the weight of the laminated glass, and it is possible to reduce the environmental load by reducing the material of the laminated glass, and it is possible to reduce the environmental load by ameliorating the fuel consumption of an automobile by weight reduction of the laminated glass.

The method for producing the laminated glass is not particularly limited. First, the interlayer film is sandwiched between the first lamination glass member and the second lamination glass member. Then, for example, by passing through pressure rolls or by sucking under reduced pressure in a rubber bag, the air remaining between the first lamination glass member, the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

Hereinafter, the present invention will be described in more detail with reference to examples and comparative examples. The present invention is not limited only to these examples.

The following materials were prepared.

With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited. When the acetal is acetoacetal or the like, the acetalization degree is calculated by measuring the acetylation degree and the content of the hydroxyl group, and calculating a mole fraction from the obtained measurement results, and then subtracting the acetylation degree and the content of hydroxyl groups from 100% by mole.

(Resin)

Polyvinyl acetate:

Polyvinyl acetate (1): following Synthesis Example 1

(Synthesis Example 1)

A glass polymerization vessel equipped with a reflux condenser, a dropping funnel, a thermometer, and a nitrogen inlet was prepared. This polymerization vessel was charged with 100 parts by weight of vinyl acetate monomer, 1.0 part by weight of 3-methyl-3-buten-1-ol (MB), and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator, 150 parts by weight of vinyl acetate monomer, and 1.5 parts by weight of 3-methyl-3-buten-1-ol (MB) were dropped over 4 hours, and polymerized for 1 hour after end of the dropping, and thus a solution containing polyvinyl acetate (1) was obtained. The solution was dried for 3 hours in an oven at 110° C. to obtain polyvinyl acetate (1). In the polyvinyl acetate (1), the ratio (peak intensity of all peaks existing at 0.06 ppm or more and 0.3 ppm or less/intensity of all peaks existing at 4.5 ppm or more and 5.3 ppm or less) (peak ratio) was 0.042.

Polyvinyl acetate (2): following Synthesis Example 2

(Synthesis Example 2)

The polyvinyl acetate (2) was obtained in the same manner as that in Synthesis Example 1 except that 3-methyl-3-buten-1-ol (MB) was changed to ethylene glycol monovinyl ether (HEVE), and the blending amounts of the vinyl acetate monomer and the ethylene glycol monovinyl ether (HEVE) were changed. In the polyvinyl acetate (2), the peak ratio was 0.037.

Polyvinyl acetate (3): following Synthesis Example 3

(Synthesis Example 3)

The polyvinyl acetate (3) was obtained in the same manner as in Synthesis Example 1 except that 3-methyl-3-buten-1-ol (MB) was changed to ethylene glycol monovinyl ether (HEVE), and the blending amounts of the vinyl acetate monomer and the ethylene glycol monovinyl ether (HEVE) were changed. In the polyvinyl acetate (3), the peak ratio was 0.02.

Polyvinyl acetate (4): following Synthesis Example 4

(Synthesis Example 4)

The polyvinyl acetate (4) was obtained in the same manner as that in Synthesis Example 1 except that 3-methyl-3-buten-1-ol (MB) was changed to ethylene glycol monovinyl ether (HEVE), and the blending amounts of the vinyl acetate monomer and the ethylene glycol monovinyl ether (HEVE) were changed. In the polyvinyl acetate (4), the peak ratio was 2.8.

Polyvinyl acetate (5): following Synthesis Example 5

(Synthesis Example 5)

The polyvinyl acetate (5) was obtained in the same manner as that in Synthesis Example 1 except that 3-methyl-3-buten-1-ol (MB) was changed to monomethylitaconic acid, and the blending amounts of the vinyl acetate monomer and the monomethylitaconic acid were changed. In the polyvinyl acetate (5), the peak ratio was 0.025.

Polyvinyl acetate (X1): following Synthesis Example X1

(Synthesis Example X1)

A glass polymerization vessel equipped with a reflux condenser, a dropping funnel, a thermometer, and a nitrogen inlet was prepared. This polymerization vessel was charged with 250 parts by weight of vinyl acetate monomer and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator was dropped over 2.5 hours, and polymerized for 2 hours after end of the dropping, and thus a solution containing polyvinyl acetate (X1) was obtained. The solution was dried for 3 hours in an oven at 110° C. to obtain polyvinyl acetate (X1).

Polyvinyl acetate (X2): following Synthesis Example X2
(Synthesis Example X2)

A glass polymerization vessel equipped with a reflux condenser, a dropping funnel, a thermometer, and a nitrogen inlet was prepared. This polymerization vessel was charged with 100 parts by weight of vinyl acetate monomer, 0.3 parts by weight of ethylene glycol monovinyl ether, and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator, 150 parts by weight of vinyl acetate monomer, and 0.45 parts by weight of 3-methyl-3-buten-1-ol were dropped over 4 hours, and polymerized for 1 hour after end of the dropping, and thus a solution containing polyvinyl acetate (X2) was obtained. The solution was dried for 3 hours in an oven at 110° C. to obtain polyvinyl acetate (X2). In the polyvinyl acetate (X2), the peak ratio was 0.01.

Polyvinyl acetate (X3): following Synthesis Example X3
(Synthesis Example X3)

A glass polymerization vessel equipped with a reflux condenser, a dropping funnel, a thermometer, and a nitrogen inlet was prepared. This polymerization vessel was charged with 100 parts by weight of vinyl acetate monomer, 40 parts by weight of ethylene glycol monovinyl ether, and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator, 150 parts by weight of vinyl acetate monomer, and 60 parts by weight of 3-methyl-3-buten-1-ol (MB) were dropped over 4 hours, and polymerized for 1 hour after end of the dropping, and thus a solution containing polyvinyl acetate (X3) was obtained. The solution was dried for 3 hours in an oven at 110° C. to obtain polyvinyl acetate (X3). In the polyvinyl acetate (X3), the peak ratio was 4.0.

Polyvinyl acetal resin:
Polyvinyl acetal resin (PVB in Tables 1, 2) (n-butyraldehyde is used, polymerization degree: 1700, content of hydroxyl group: 32% by mole, acetylation degree: 1% by mole, acetalization degree: 67% by mole)
(Plasticizer)
D931 (Bis(2-butoxyethyl) adipate)
DBA (Dibutyl adipate)
3GO (triethylene glycol di-2-ethylhexanoate)
(Metal Salt M)
Mg mixture (50:50 (weight ratio) mixture of magnesium 2-ethylbutyrate and magnesium acetate)
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
BHT (2,6-di-t-butyl-p-cresol)

EXAMPLE 1

Preparation of composition for forming first layer:
The following ingredients were mixed, and kneaded sufficiently with a mixing roll to obtain a composition for forming a first layer.
Polyvinyl acetate (1) 100 parts by weight
Plasticizer (D931) 70 parts by weight
Ultraviolet ray screening agent (Tinuvin 326) in an amount of 0.2% by weight in the obtained first layer
Oxidation inhibitor (BHT) in an amount of 0.2% by weight in the obtained first layer Preparation of composition for forming second layer and third layer:
The following ingredients were mixed, and kneaded sufficiently with a mixing roll to obtain a composition for forming a second layer and a third layer.
Polyvinyl acetal resin (PVB) 100 parts by weight
Plasticizer (D931) 35 parts by weight
Metal salt M (Mg mixture) in such an amount that Mg is 70 ppm in the obtained second layer and third layer
Ultraviolet ray screening agent (Tinuvin 326) in an amount of 0.2% by weight in the obtained second layer and third layer
Oxidation inhibitor (BHT) in an amount of 0.2% by weight in the obtained second layer and third layer Preparation of interlayer film:
By coextruding the obtained composition for forming a first layer and the obtained composition for forming a second layer and a third layer using a coextruder, an interlayer film having a structure of a second layer (370 μm in thickness)/a first layer (100 μm in thickness)/a third layer (370 μm in thickness) was obtained.

Preparation of laminated glass:
The obtained interlayer film was cut into a size of 30 cm long×2.5 cm wide. As the first lamination glass member, and the second lamination glass member, two glass plates (clear glass, 30 cm long×2.5 cm wide×2.5 mm thick) were prepared. The interlayer film was sandwiched between the two glass plates to obtain a laminate. The laminate was put into a rubber bag and the inside thereof was degassed for 20 minutes with a degree of vacuum of 2.6 kPa, after which the laminate in the degassed condition was transferred into an oven, and vacuum-pressed by retention at 90° C. for 30 minutes, and thus the laminate was preliminarily press-bonded. The preliminarily press-bonded laminate was subjected to press-bonding for 20 minutes under conditions of 135° C. and a pressure of 1.2 MPa in an autoclave to obtain a sheet of laminated glass.

EXAMPLES 2 to 9 AND COMPARATIVE EXAMPLES 1 to 4

A laminated glass was obtained in the same manner as that in Example 1 except that the kinds of the polyvinyl acetate, the polyvinyl acetal resin, and the plasticizer, and the blending amounts thereof were changed as shown in the following Tables 1, 2.

In Example 7, as the plasticizer, 30 parts by weight of plasticizer (D931) and 5 parts by weight of plasticizer (DBA) were used.
(Evaluation)
(1) Measurement of $^1$H-NMR After swelling 100 mg of polyvinyl acetate with a small amount of chloroform, 250 μL of a trimethylsilylating agent (N,O-bis(trimethylsilyl)trifluoroacetamide: BSTFA) was added, and stirred in a shaker for 1 hour. A deuteriochloroform solvent (250 μL) was added, and the solution was stirred for another 1 hour in the shaker to obtain a trimethylsilylated polyvinyl acetate.

Trimethylsilylated polyvinyl acetate was dried on a hot plate at 80° C. for 1 hour, and further dried in vacuo at 100°

C. for 1 hour to remove excess BSTFA, and then the residue was dissolved in deuteriochloroform, and $^1$H-NMR was measured.

From the measurement result, the ratio (peak intensity of all peaks existing at 0.06 ppm or more and 0.3 ppm or less/intensity of all peaks existing at 4.5 ppm or more and 5.3 ppm or less) (peak ratio) was determined.

(2) Cloud Point

For combinations of the plasticizer commonly contained in the first layer and the second layer, the thermoplastic resin (2) in the second layer, and the polyvinyl acetate (1) in the first layer, the aforementioned cloud point was evaluated.

In conformity with JIS K2266 "Testing method for pour point of crude oil and petroleum products, and cloud point of petroleum products", a cloud point was determined in accordance with the above-described first method for determining cloud point. Results of cloud point (2)—cloud point (1) are described. Since the second layer and the third layer are the same, the result of cloud point (3)—cloud point (1) is the same as the result of cloud point (2)—cloud point (1).

(3) Adhesive Force

A composition for forming a first layer was applied on a corona-treated PET film (70 μm thick) to form a first layer having a thickness of 100 μm, and thus a first laminate was obtained.

A composition for forming a second layer and a third layer was applied on a PET film (100 μm thick) to form a second layer having a thickness of 370 μm, and thus a second laminate was obtained.

Each of the first and second laminates was cut into a size of 25 mm and 80 mm, and lamination at 110° C. was conducted while the first layer and the second layer face each other. A test sample of PET film/first layer/second layer/PET film was obtained.

For the obtained test sample, a 180-degrees peel test was conducted at 25° C. in the condition of a stress rate of 300 mm/min. using a tensile tester, and adhesive force between the first layer and the second layer (also corresponding to the third layer) was evaluated.

(4) Folding Test

The test sample obtained in the evaluation of adhesive force of (3) was prepared. The test sample was folded in half at an angle of 180 degrees, and restored, and whether peeling occurs in the fold part was evaluated. While peeling of 1 cm occurred in Comparative Example 1, no peeling occurred in Example 2.

(5) Sound Insulating Property (Primary Loss Factor at 20° C.)

The obtained laminated glass was left to stand at room temperature (25° C.) for 2 weeks. The laminated glass after left to stand was excited with a vibration generator for damping test ("Vibrator G21-005D" available from Shinken. Co., Ltd.). The resultant vibration characteristic was amplified with a mechanical impedance measuring device ("XG-81" available from RION Co., Ltd.), and the vibration spectrum was analyzed with an FFT spectrum analyzer ("FFT analyzer SA-01A2" available from RION Co., Ltd.).

The details and the results are shown in the following Tables 1, 2.

TABLE 1

| | | | Example 1 | Example 2 | Example 3 | Example 4 | Example 5 | Example 7 | Example 8 | Example 9 |
|---|---|---|---|---|---|---|---|---|---|---|
| First layer | Polyvinyl acetate | Kind of polyvinyl acetate | (1) | (2) | (3) | (4) | (5) | (2) | (1) | (2) |
| | | Peak ratio (NMR) | 0.042 | 0.037 | 0.02 | 2.8 | 0.025 | 0.037 | 0.042 | 0.037 |
| | | Weight average molecular weight | 714000 | 698000 | 699000 | 500000 | 606000 | 698000 | 714000 | 698000 |
| | | Content (parts by weight) | 100 | 100 | 100 | 100 | 100 | 100 | 100 | 100 |
| | Plasticizer | Kind | D931 | D931 | D931 | D931 | D931 | D931 | D931 | D931 |
| | | Content (parts by weight) | 70 | 70 | 70 | 70 | 70 | 70 | 50 | 50 |
| Second and third layers | Resin | Kind | PVB | PVB | PVB | PVB | PVB | PVB | PVB | PVB |
| | | Content (parts by weight) | 100 | 100 | 100 | 100 | 100 | 100 | 100 | 100 |
| | Plasticizer | Kind | D931 | D931 | D931 | D931 | D931 | D931/DBA | D931 | D931 |
| | | Content (parts by weight) | 35 | 35 | 35 | 35 | 35 | 30/5 | 35 | 35 |
| Evaluation | Value of cloud point (2) - cloud point (1) (° C.) and value of cloud point (3) - cloud point (1) (° C.) | | 85 | 85 | 85 | 85 | 85 | 85 | 85 | 85 |
| | Adhesive force (N/25 mm) | | 2 | 2.5 | 1.5 | >10 | 1 | 2.5 | 2 | 2.5 |
| | Sound insulating property after 2 weeks (primary loss factor at 20° C.) | | 0.39 | 0.36 | 0.4 | 0.31 | 0.4 | 0.33 | 0.37 | 0.35 |

TABLE 2

|  |  |  | Comparative Example 1 | Comparative Example 2 | Comparative Example 3 | Comparative Example 4 |
|---|---|---|---|---|---|---|
| First layer | Polyvinyl acetate | Kind of polyvinyl acetate | (X1) | (X2) | (X3) | (X1) |
|  |  | Peak ratio (NMR) | — | 0.01 | 4.0 | — |
|  |  | Weight average molecular weight | 600000 | 280000 | 420000 | 600000 |
|  |  | Content (parts by weight) | 100 | 100 | 100 | 100 |
|  | Plasticizer | Kind | D931 | D931 | D931 | D931 |
|  |  | Content (parts by weight) | 70 | 70 | 70 | 70 |
| Second and third layers | Resin | Kind | PVB | PVB | PVB | PVB |
|  |  | Content (parts by weight) | 100 | 100 | 100 | 100 |
|  | Plasticizer | Kind | D931 | D931 | D931 | 3GO |
|  |  | Content (parts by weight) | 35 | 35 | 35 | 35 |
| Evaluation |  | Value of cloud point (2) - cloud point (1) (° C.) and value of cloud point (3) - cloud point (1) (° C.) | 85 | 85 | 85 | −53 |
|  |  | Adhesive force (N/25 mm) | 0.4 | 0.7 | >10 | 0.4 |
|  |  | Sound insulating property after 2 weeks (primary loss factor at 20° C.) | 0.4 | 0.4 | 0.1 | 0.2 |

EXPLANATION OF SYMBOLS

1: First layer
1a: First surface
1b: Second surface
2: Second layer
2a: Outer surface
3: Third layer
3a: Outer surface
11, 11A: Interlayer film
11a: First surface
11b: Second surface
21: First lamination glass member
22: Second lamination glass member
31, 31A: Laminated glass
51: Roll body
61: Winding core

The invention claimed is:

1. An interlayer film for laminated glass having a one-layer or a two or more-layer structure,
the interlayer film comprising a first layer containing polyvinyl acetate,
provided that when a compound is obtained by trimethylsilylating the polyvinyl acetate in presence of N,O-bis(trimethylsilyl)trifluoroacetamide, the compound shows 1) a hydrogen peak of trimethylsilyl group existing at 0.06 ppm or more and 0.3 ppm or less in $^1$H-NMR measurement in chloroform-d, and 2) a ratio of peak intensity of all peaks existing at 0.06 ppm or more and 0.3 ppm or less, to intensity of all peaks existing at 4.5 ppm or more and 5.3 ppm or less satisfying 0.02 or more and 3 or less in $^1$H-NMR measurement in chloroform-d.

2. The interlayer film for laminated glass according to claim 1, wherein the polyvinyl acetate has a weight average molecular weight of 300000 or more.

3. The interlayer film for laminated glass according to claim 1, wherein the first layer contains a plasticizer.

4. The interlayer film for laminated glass according to claim 3, wherein a content of the plasticizer per 100 parts by weight of the polyvinyl acetate in the first layer is 30 parts by weight or more.

5. The interlayer film for laminated glass according to claim 1, wherein
the interlayer film includes a second layer, and
the second layer is layered on a first surface of the first layer.

6. The interlayer film for laminated glass according to claim 5, wherein the second layer contains a thermoplastic resin.

7. The interlayer film for laminated glass according to claim 6, wherein the thermoplastic resin in the second layer is a polyvinyl acetal resin.

8. The interlayer film for laminated glass according to claim 6, wherein
the first layer contains a plasticizer, and
the second layer contains a plasticizer.

9. The interlayer film for laminated glass according to claim 8, wherein
a plasticizer having the largest content in the second layer, and a plasticizer having the largest content in the first layer are the same, and
a combination of a plasticizer having the largest content in the second layer, the thermoplastic resin in the second layer, a plasticizer having the largest content in the first layer, and the polyvinyl acetate in the first layer satisfies a configuration in which a cloud point measured by using a mixed liquid of 100 parts by weight of the plasticizer having the largest content in the plasticizer in the second layer, and 8 parts by weight of the thermoplastic resin in the second layer is higher than a cloud point measured by using a mixed liquid of 100 parts by weight of the plasticizer having the largest content in the plasticizer in the first layer and 8 parts by weight of the polyvinyl acetate in the first layer by 30° C. or more.

10. The interlayer film for laminated glass according to claim 5, wherein
the interlayer film includes a third layer, and
the third layer is layered on a second surface opposite to the first surface of the first layer.

11. The interlayer film for laminated glass according to claim 10, wherein the third layer contains a thermoplastic resin.

12. The interlayer film for laminated glass according to claim 11, wherein the thermoplastic resin in the third layer is a polyvinyl acetal resin.

13. The interlayer film for laminated glass according to claim 10, wherein
the first layer contains a plasticizer,
the second layer contains a plasticizer, and
the third layer contains a plasticizer.

14. The interlayer film for laminated glass according to claim 13, wherein
the second layer contains a thermoplastic resin,
the third layer contains a thermoplastic resin,
a content of the plasticizer per 100 parts by weight of the polyvinyl acetate in the first layer is larger than a content of the plasticizer per 100 parts by weight of the thermoplastic resin in the second layer, and
a content of the plasticizer per 100 parts by weight of the polyvinyl acetate in the first layer is larger than a content of the plasticizer per 100 parts by weight of the thermoplastic resin in the third layer.

15. A roll body comprising:
a winding core; and
the interlayer film for laminated glass according to claim 1,
the interlayer film for laminated glass being wound around an outer periphery of the winding core.

16. A laminated glass comprising:
a first lamination glass member;
a second lamination glass member; and
the interlayer film for laminated glass according to claim 1,
the interlayer film for laminated glass being arranged between the first lamination glass member and the second lamination glass member.

* * * * *